United States Patent [19]
Banji

[11] Patent Number: 5,406,043
[45] Date of Patent: Apr. 11, 1995

[54] METHOD FOR MANUFACTURING MASTER OF DIE FOR SHAPING GOLF BALL

[75] Inventor: Masatoshi Banji, Kobe, Japan

[73] Assignee: Sumitomo Rubber Industries, Ltd., Japan

[21] Appl. No.: 73,041

[22] Filed: Jun. 8, 1993

[30] Foreign Application Priority Data

Jun. 8, 1992 [JP] Japan .................. 4-174692

[51] Int. Cl.⁶ .............. B23H 1/00; B23H 9/12
[52] U.S. Cl. .......................................... 219/69.17
[58] Field of Search ............. 219/69.17, 69.15, 69.2; 273/232; 40/327; 425/175; 408/1 R

[56] References Cited

U.S. PATENT DOCUMENTS

| | | | |
|---|---|---|---|
| 3,498,158 | 3/1970 | Kougel | 219/69.17 |
| 4,954,022 | 9/1990 | Underwood et al. | 408/1 R |
| 5,005,838 | 4/1991 | Oka | 273/232 |
| 5,127,655 | 7/1992 | Yamada | 273/232 |

FOREIGN PATENT DOCUMENTS 0252842  1/1988 European Pat. Off. .
2215620  9/1989 United Kingdom ............ 273/232
2242363 10/1991 United Kingdom ............ 273/232

OTHER PUBLICATIONS

Patent Abstracts of Japan, vol. 16, No. 149 (M-1234) (5192) 12 Apr. 1992 & JP-A-40 08 414.
Patent Abstracts of Japan, vol. 16, No. 304 (C-959) (5347) 6 Jul. 1992 & JP-A-40 84 978.
Patent Abstracts of Japan, vol. 16, No. 304 (C-959) (5347) 6 Jul. 1992 & JP-A-40 84 979.
Patent Abstracts of Japan, vol. 9, No. 179 (M-399) (1902) 24 Jul. 1985 & JP-A-60 048 223.

*Primary Examiner*—Goeffrey S. Evans

[57] ABSTRACT

A method for forming a master die from a conductive material using electrical discharge machining. The conductive material is created to have a plurality of dimples that are non-circular in a direction perpendicular to the spherical surface of a conductive material and/or in a vertical cross section. The plurality of dimples being formed by electric discharge machining using an electrode that is moved in a direction perpendicular to the surface of the material.

16 Claims, 5 Drawing Sheets

METHOD FOR MANUFACTURING MASTER OF DIE FOR SHAPING GOLF BALL

BACKGROUND OF THE INVENTION

1. Field of the Invention

The present invention relates to a method for manufacturing the master of a die for shaping a golf ball.

2. Description of the Related Arts

Normally, the semispheric concave of the die for shaping a material into the golf ball is formed by transferring a plurality of small concaves of the master to a material to be shaped into the die by various methods. The small concaves for shaping dimples of the golf ball are formed on the material of the master by a rotary cutting tool. Therefore, the small concaves are necessarily circular in a direction perpendicular to the surface of the master.

The golf ball formed by the die manufactured by reversing the master has only circular dimples on the surface thereof in a direction perpendicular to the surface of the golf ball. Thus, it is very difficult to produce a master for manufacturing a golf ball having uncircular dimples formed thereon using conventional methods.

In recent years, there is a growing demand for the formation of uncircular shaped dimples including for example, elliptic, polygonal or the like to improve the aerodynamic characteristics of the golf ball. But as described above, it is very difficult and takes much time and labor to form the dimple-forming small concaves on the material to be formed into the master using conventional methods.

The dimple of the golf ball is closely related to the flight characteristic of the golf ball. Thus, it is necessary that the height of the small convex of the die for shaping the dimple and the width of the bottom portion thereof be close as between to hold tolerances as close as approximately 0.001 mm to 0.01 mm, respectively.

SUMMARY OF THE INVENTION

It is an object of the present invention to provide a method for easily and accurately manufacturing the master of a die for shaping a golf ball by forming a plurality of small concaves, for forming dimples on the surface of the golf ball, on a semispheric surface of a material of the master in such a manner that the small concaves are uncircular in a direction perpendicular to the semispherical surface of the material and/or a vertical section of each small concave.

In accomplishing this and other objects, there is provided a method for forming a plurality of small concaves, for forming dimples on the surface of a golf ball, on a semispheric surface of a material of the master using an electric discharge machining in such a manner that the small concaves are nonspherical in a direction perpendicular to the semispherical surface and/or in a vertical section of each small concave.

According to the method for manufacturing the master of a die for shaping a golf ball, a plurality of small concaves for forming dimples on the surface of the golf ball can be formed easily and accurately by electric discharge machining on a semispherical surface of a material of the master in such a manner that the small concaves are uncircular in a direction perpendicular to the semispherical surface of the material and/or a vertical section of each small concave. Electric discharge machining can be performed on even high hardness material such as super-hard alloy. For example, the depth of the small concave of the die for shaping the dimple and the diameter thereof hold with acceptable tolerances as close as approximately 0.001 mm to 0.01 mm, respectively.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
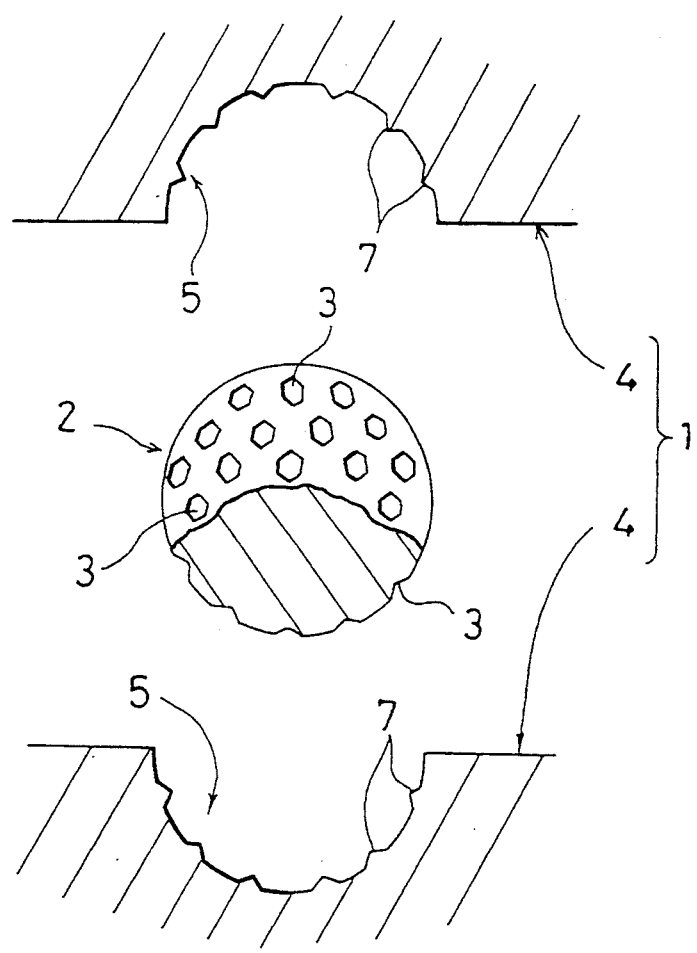
FIG. 1 is a sectional view showing a golf ball and a die for shaping the golf ball according to a method for manufacturing a master of the present invention.

Before the description of the present invention proceeds, it is to be noted that like parts are designated by like reference numerals throughout the accompanying drawings.

Referring to the drawings, a preferred embodiment of the present invention is described below.

FIG. 1 shows a section of the principal portion of a die 1 made of brass or iron and steel and the golf ball 2 having a plurality of nonspherical shaped dimples formed using the die 1. The dimples 3 are nonspherical in a direction perpendicular to the surface of the golf ball 2 and the vertical section of the dimples 3. In the example shown in FIG. 1, each of the dimple 3 is hexagonal in the direction perpendicular to the golf ball 2 and triangular in the vertical section of the dimple 3.

The die 1 comprises a pair of female dies 4 and 4 opposed to each other. Concaves 5 in the configuration of the reversed semispherical surface of the golf ball 2 are formed on each of the female dies 4.

Figure 2:
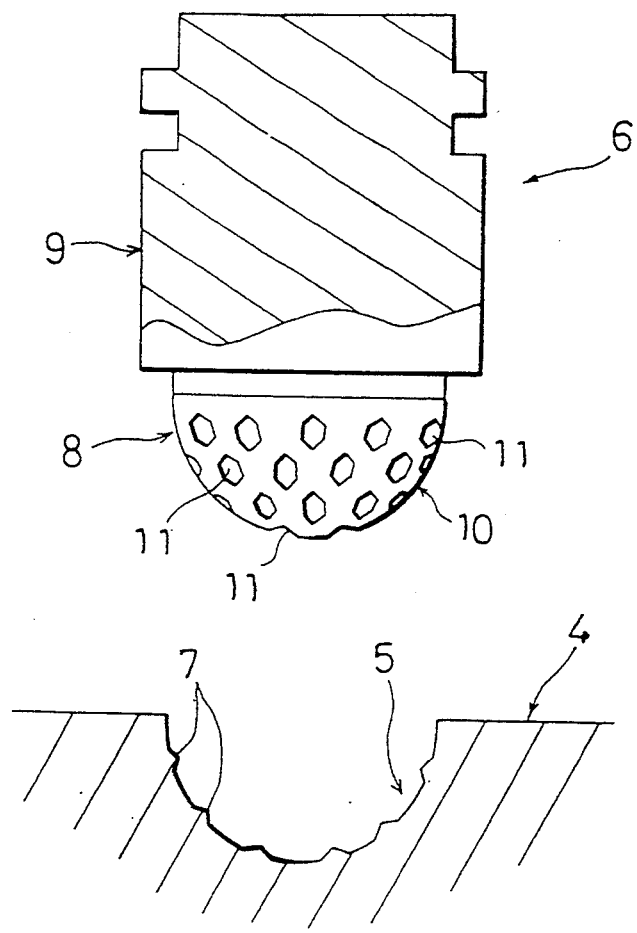
FIG. 2 is a sectional view showing a master and the die for shaping the golf ball according to an embodiment of the present invention.

The concaves 5 are formed on the female dies 4 by casting, plating or plastic machining by using a master 6 as shown in FIG. 2, having a plurality of small convex surfaces 7 for forming dimples on the surface of the female die 4.

Referring to FIG. 2, the master 6 includes a semispheric surface 8 disposed in the lower end thereof and a shaft 9. A plurality of small concaves 11 are formed on the semispherical surface 10. The small concaves 11 are used to form nonspherical dimples in the direction perpendicular to the surface of the semispherical surface 10 and the vertical section of each small concave 11. In the example shown in FIG. 2, the small concaves 11 are hexagonal in the direction perpendicular to the surface of the semispheric surface 10 and triangular in the vertical section of the each small concave 11.

Figure 3:
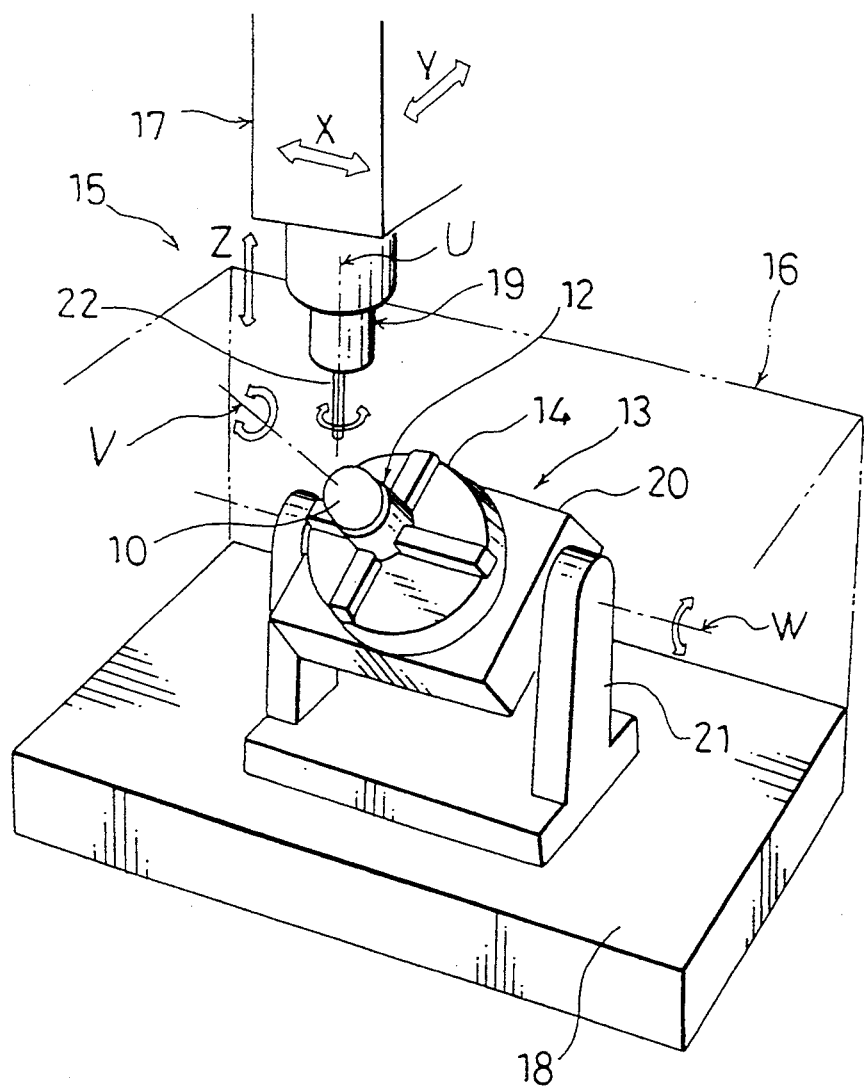
FIG. 3 is a perspective view showing an apparatus, for manufacturing the master and the die for shaping the golf ball to be used in carrying out the method according to the present invention.

FIG. 3 shows an apparatus for manufacturing the small concaves 11. That is, referring to FIGS. 3 and 4, the small concaves 11 are formed on a material 12 of the master 6 by electric discharge machining by using an indexing jig 13 and an electric discharge device 15.

The hardness of the material 12 is in the range from HRC50 to HRC80. More favorably, the hardness of the material 12 is in the range from HRC60 to HRC70. For example, die steel, the hardness of which is in the range from HRC30 to HRC40 is quenched to obtain the above-described hardness. A material such as a superhard alloy having a high hardness eliminates the need for quenching in manufacturing the master 6.

The indexing jig 13 includes a chucking portion 14 for clamping the material 12; a pivotal portion 20 on which the chucking portion 14 is mounted to be rotatable about a V-axis (axis of the chucking portion 14); and a base 21 for supporting the pivotal portion 20 so that the pivotal portion 20 is rotatable about a horizontal W-shaft. The chucking portion 14 and the pivotal portion 20 are driven by a driving mechanism such as a motor (not shown).

The electric discharge device 15 includes an oil reservoir 16 and a head 17 mounted on a column. The indexing jig 13 is installed on a table 18 of the oil reservoir 16. An electrode 22 is held at the lower end of the head 17 via a holding portion 19.

The head 17 is movable in an X-direction, Y-direction, and Z-direction perpendicular to each other. The holding portion 19 is rotatable about a vertical U-axis. The head 17 and the holding portion 19 are driven by a driving mechanism such as a motor not shown.

The driving mechanism for driving the chucking portion 14, the pivotal portion 20, the head 17, and the holding portion 19 are sequentially moved to a programmed position or rotated by a programmed angle according to an instruction of a control device so as to accomplish positioning and indexing thereof.

The electric discharge device 15 has a contact detecting function for detecting the position of the head 17 when the electrode 22 and the material 12 are conductive to each other as a result of the contact between the electrode 22 and a workpiece, for example, the material 12 in this embodiment.

The control device stores a plurality of position data detected by the contact detecting function and calculates the positional data by four fundamental rules of arithmetics. The result of the calculation is displayed on a display screen not shown in the drawings.

Figure 5:
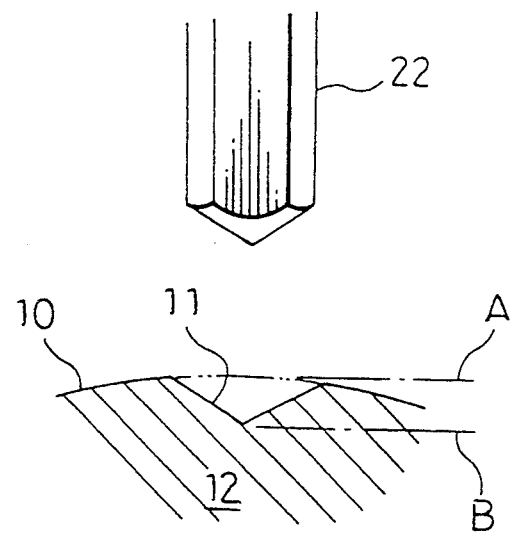
FIG. 5 is a side elevational view showing the lower end of an electrode of the apparatus and a sectional view showing a small concave in a material defining the master.

FIG. 5 is a side elevational view showing the area around the lower end of the electrode 22. In conformity with the configuration of the dimple 3 shown in FIG. 1, the electrode 22 is hexagonal in a transverse cross section thereof, and the lower end thereof is conic or pyramidal shaped. That is, the configuration of the electrode 22 is equal to that of the dimple 3 shown in FIG. 1 or similar thereto. The electrode 22 is manufactured using an NC carving device.

The pivotal portion 20 of the indexing jig 13 shown in FIG. 3 is rotatable at least 90° about a W-axis and the chucking portion 14 is rotatable at least 360° about the V-axis so that the material 12 is pivotal between the state in which the material 12 is horizontal and the state in which the material 12 is vertical with respect to the chucking portion 14.

Figure 4:
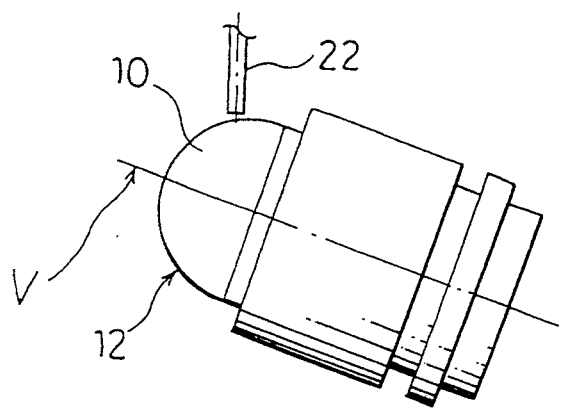
FIG. 4 is an explanatory view showing a principal portion of the apparatus of FIG. 3.

Referring FIGS. 3 and 4, any desired portion of the semispherical surface 10 of the material 12 can be placed in correspondence with the position of the electrode 22 by rotating the pivotal portion 20 and the chucking portion 14.

The small concaves 11 are formed by using the indexing jig 13 and the electric discharge device 15 as follows. The material 12 is held by the chucking portion 14 of the indexing jig 13 with the axis of the material 12 coinciding with the V-axis.

Then, the electrode 22 as held on the holding portion 19 of the electric discharge device 15 and the material 12 are placed at a machining starting position. At this time, the control device stores dimension data (A) on the position at which the contact detecting function has detected a contact between the electrode 22 and the semispherical surface 10 of the material 12, namely, the conduction therebetween. The control device stores the dimension information (A) of the small concave 11 (shown in FIG. 5) detected before electric discharge machining is performed.

Oil is stored in the oil reservoir 16 before or after electric discharge machining is effected on the semispherical surface 10 of the material 12 in a condition set to obtain a predetermined degree of roughness. As a result, a plurality of the small concaves 11 are formed on the semispherical surface 10. Referring to FIGS. 2 and 5, the small concaves 11 are nonspherical in the direction perpendicular to the surface of the semispherical surface 10 and the vertical section of each small concave 11.

At this time, the pivotal portion 20 and the chucking portion 14 are rotated so that predetermined positions of the semispheric surface 10 of the material 12 to be machined by electric discharge into the small concaves 11 are sequentially disposed to be coincident with the axis of the electrode 22. As a result, a plurality of small concaves 11 are formed on the semispherical surface 10.

Preferably, a plurality of the electrodes 22 are used by positioning them sequentially so that the small concaves 11 are formed by a plurality of electric discharge machining processes. It is easy to use a plurality of electrodes in different configurations so as to form the small concaves 11 into a configuration formed in combination thereof. It is also preferable to form the small concaves 11 in three processes, namely, rough machining process, finish machining process, and super-finishing machining process. The conditions of electric discharge machining of the three processes are differentiated from each other. Each of rough machining, finish machining, and super-finishing machining may comprise two or more processes different from each other.

An example of the condition of electric discharge machining within oil with non-consumption of electrodes is shown in Table 1 below.

TABLE 1

| | Example of electric discharge machining | | | | |
|---|---|---|---|---|---|
| process | (7) | (8) | (9) | (10) | (11) |
| (1) | 80 | 80 | 40 | 14 | 6 |
| (2) | 40 | 30 | 30 | 16 | 12 |
| (3) | 9 | 6 | 4.5 | 3 | 1.5 |
| (4) | 60 | 100 | 100 | 120 | 120 |
| (5) | 0.35 | 0.35 | 0.35 | 0.36 | 0.38 |

TABLE 1-continued

| | Example of electric discharge machining | | | | |
|---|---|---|---|---|---|
| process | (7) | (8) | (9) | (10) | (11) |
| (6) | 0.35 | 0.35 | 0.35 | 0.36 | 0.38 |

(1) discharge pulse time period: μ sec
(2) suspension pulse time period: μ sec
(3) peak value of main power source: A
(4) servo reference voltage: V
(5) jump rise time period: sec
(6) jump discharge time period: sec
(7) first process: rough machining
(8) second process: finish machining (1)
(9) third process: finish machining (2)
(10) fourth process: super-finishing machining (1)
(11) fifth process: super-finishing machining (2)

Referring to FIG. 5, the control device stores data (B) on the position at which the contact detecting function has detected a contact between the electrode 22 and the semispherical surface 10 of the material 12, namely, the conduction therebetween, detected after the electric discharge machining is performed. The control device then calculates the difference between the data (A) and the data (B) for each concave 11. In this manner, the small concaves 11 can be formed to a desired dimension by electric discharge machining by correcting the indicated dimension of the small concave 11 based on the calculated result.

Since the dimension of the small concaves 11 can be measured using the electric discharge device 15 before and after electric discharge machining is performed, it is unnecessary to remove the material 12 from the indexing jig 13 frequently so as to measure the dimension of the small concave 11. Accordingly, the small concaves 11 can be formed with a high degree of accuracy and efficiency.

In forming the small concaves 11 by electric discharge machining, each of the small concaves 11 can be formed on the semispherical surface 10 of the material 12 in a desired direction by rotating the electrode 22 at a predetermined angle about the U-axis via the holding portion 19. That is, the golf ball does not have to be physically moved to complete a concave.

Figure 6:
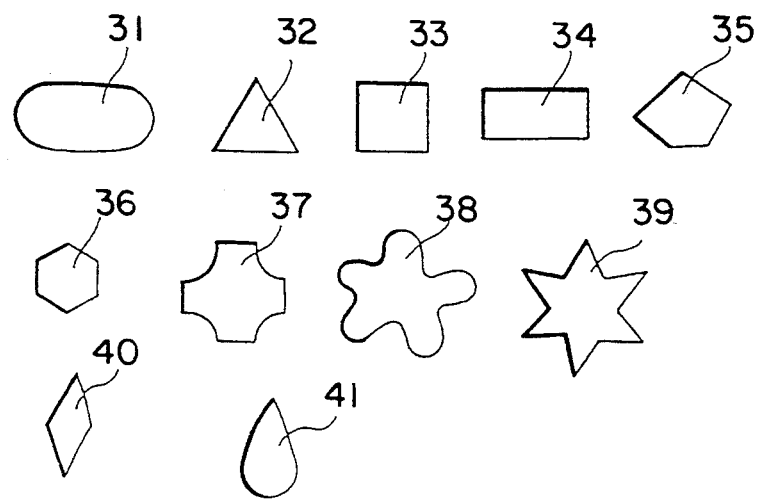
FIG. 6 is an explanatory view showing small concaves, in various configurations, to be formed on the material of the master.

As shown in FIG. 6, the small concaves 11 can be formed in various configurations in a plan view thereof. For example, the concaves may be elliptical, triangular, pentagonal, cross, star-shaped, rhombic or tear-shaped.

Figure 7:
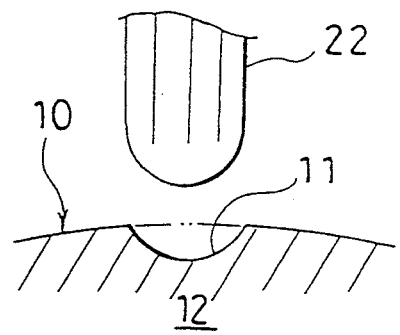
FIG. 7 is a side elevational view showing another preferred embodiment of the present invention.

In the embodiment, the small concaves 11 are nonspherical in the direction perpendicular to the semispherical surface 10 and the vertical section of each small concave 11. It is possible to form the small concave 11 in a circular configuration as shown in FIG. 7 in the vertical section thereof by combining any one of the configurations shown in FIG. 6 and that shown in FIG. 7 with each other.

Figure 8:
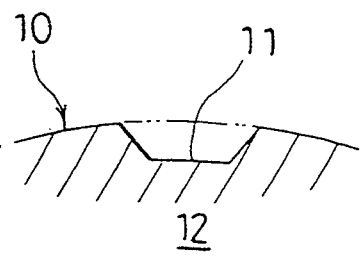
FIG. 8 is a side elevational view showing a further preferred embodiment of the present invention.

It is also possible to form the small concave 11 in a circular configuration in the direction perpendicular to the semispherical surface 10, a noncircular configuration such as a triangular configuration as shown in FIG. 5, or in a trapezoidal configuration in the vertical section of each small concave 11 as shown in FIG. 8.

It is also possible to form on the surface of the golf ball a plurality of configurations selected from those shown in FIG. 6 in the direction perpendicular to the surface thereof or form thereon two or more noncircular configurations in the vertical section of each small concave 11. That is, the small concaves 11 may be formed in a plurality of noncircular configurations on the semispherical surface 10 depending on the preformance.

Since the small concaves 11 are formed by electric discharge machining, the small concaves 11 can be formed after the material 12 is heat-treated unlike conventional methods in which the material of the master of a die is heat-treated after small concaves are formed by electric discharge machining. That is, the method according to the present invention is capable of forming the small concaves 11 on the material 12 more accurately than the conventional method.

It is also possible to carve the small concaves 11 on the material 12 by rotating or moving the chucking portion 14, the pivotal portion 20, and the oil reservoir 16 simultaneously, while electric discharge machining is being preformed. In order to form the small convexes 7 (shown in FIG. 1), for forming dimples on the surface of the golf ball, on the inner surface of the concave 5 of the die 1 without using the master 6, the inner surface of the concave 5 may be removed except portions to be formed into the small convexes 7 by performing electric discharge machining. The small convexes 7 may be formed in a circular configuration or a noncircular configuration in the direction perpendicular to the inner surface of the concave 5 and/or the vertical section of each small convex 7.

The method for manufacturing the master according to the present invention provides the following effects.

Unlike conventional methods, the noncircular small concaves 11 can be formed on the material 12 of the master 6 of the die 1 with ease and accuracy. The master 6 having the small concaves 11 formed thereon allows the golf ball 2 to have dimples in various noncircular configurations on the surface thereof. Therefore, the golf ball manufactured according to the method of the present invention has more favorable aerodynamic characteristics than the golf ball manufactured by conventional methods. In addition, dimples can be freely designed.

It is known that the dimple of the golf ball is closely related to the flight characteristics of the golf ball. The master 6 of the die 1 allows the dimension of the small convex 7 of the die 1 to be accurate. As a result, the dimple has a high degree of tolerance and thus the golf ball has a uniform flight characteristic.

The method according to the present invention allows the master 6 to have a sufficiently high hardness and to be durable.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of manufacturing a master used in forming a female die for creating a golf ball with a plurality of small non-circular shaped dimples on the spherical surface of the golf ball, the steps comprising:
   detecting the location of an electric discharge means on the spherical surface of a conductive material, said electric discharge means having an electrode with one end corresponding to the size of each of said plurality of non-circular shaped dimples, by using a contact detecting means for detecting when the electrode is in electrical contact with the spherical surface of the conductive material and for outputting detection information to a control means for storing the location of each of said plurality of dimples on the spherical surface of the material and moving the electrode to desired locations using the detection information; and forming each of the plurality of non-circular shaped dimples by electric discharge on the spherical surface of the material using the control means to move the electrode to a position on the spherical surface for each one of said plurality of dimples and in a direction substantially perpendicular to the spherical surface of the material so that each of said dimples is formed in a non-circular shape of in a direction perpendicular to the spherical surface or non-circular in a vertical cross section of the spherical surface or non-circular both in a direction perpendicular to the spherical surface and in a vertical cross section of the spherical surface.

2. The method as defined in claim 1, wherein prior to the process of forming, the material is of a hardness in the range of between 50 to 80 degrees in HRC.

3. The method as defined in claim 1, wherein said detecting step further comprising determining a starting position for the electrode with respect to the spherical surface of the conductive material prior to forming the plurality of dimples wherein the starting position is determined by electrical contact between the electrode and the material.

4. The method as defined in claim 1, wherein the step of forming further comprising the steps of:
rough working the spherical surface of the material prior to forming the plurality of dimples;
finish working the spherical surface of the material after the dimples are formed; and
super finish working the spherical surface after the finish working step.

5. The method as defined in claim 4, wherein in said forming step, a different electrode is used in each of said steps of rough working, finish working and super finish working.

6. The method as defined in claim 1, wherein in said forming step each of said plurality of dimples is in the shape of a pyramid.

7. The method as defined in claim 1, wherein in said forming step each of said plurality of non-circular shaped dimples is formed in the shape of a truncated pyramid.

8. The method as defined in claim 1, wherein in said forming step each of said plurality of non-circular shaped dimples is elliptically shaped in a direction perpendicular to the spherical surface of the material.

9. The method as defined in claim 1, wherein in said forming step each of said plurality of non-circular shaped dimples is triangular shaped in a direction perpendicular to the spherical surface of the material.

10. The method as defined in claim 1, wherein in said forming step each of said plurality of non-circular shaped dimples is pentagon shaped in a direction perpendicular to the spherical surface of the material.

11. The method as defined in claim 1, wherein in said forming step each of said plurality of non-circular shaped dimples is star shaped in a direction perpendicular to the spherical surface of the material.

12. The method as defined in claim 1, wherein in said forming step each of said plurality of non-circular shaped dimples is star shaped in a direction perpendicular to the spherical surface of the material.

13. The method as defined in claim 1, wherein in said forming step each of said plurality of non-circular shaped dimples is tear shaped in a direction perpendicular to the spherical surface of the material.

14. The method as defined in claim 1, wherein in said forming step each of said plurality of non-circular shaped dimples is cross shaped in a direction perpendicular to the spherical surface of the material.

15. The method as defined in claim 1, further comprising:
before said detecting step, holding said conductive material in an indexing jig having a chuck supported by a rotatable portion; and wherein in said forming step, moving the conductive material with respect to said electrode by rotating said chuck in a first direction and said rotatable portion in a second direction.

16. The method as defined in claim 1, wherein in said forming step each of said non-circular dimples being forming by repeating electrical discharges while moving the electrode between a first position near the spherical surface of the material to a second position comparatively further from the surface until each respective dimple is formed.

* * * * *